Aug. 9, 1932.  A. E. ANDERSON  1,871,401
SYSTEM OF ELECTRIC DISTRIBUTION
Filed Oct. 23, 1928
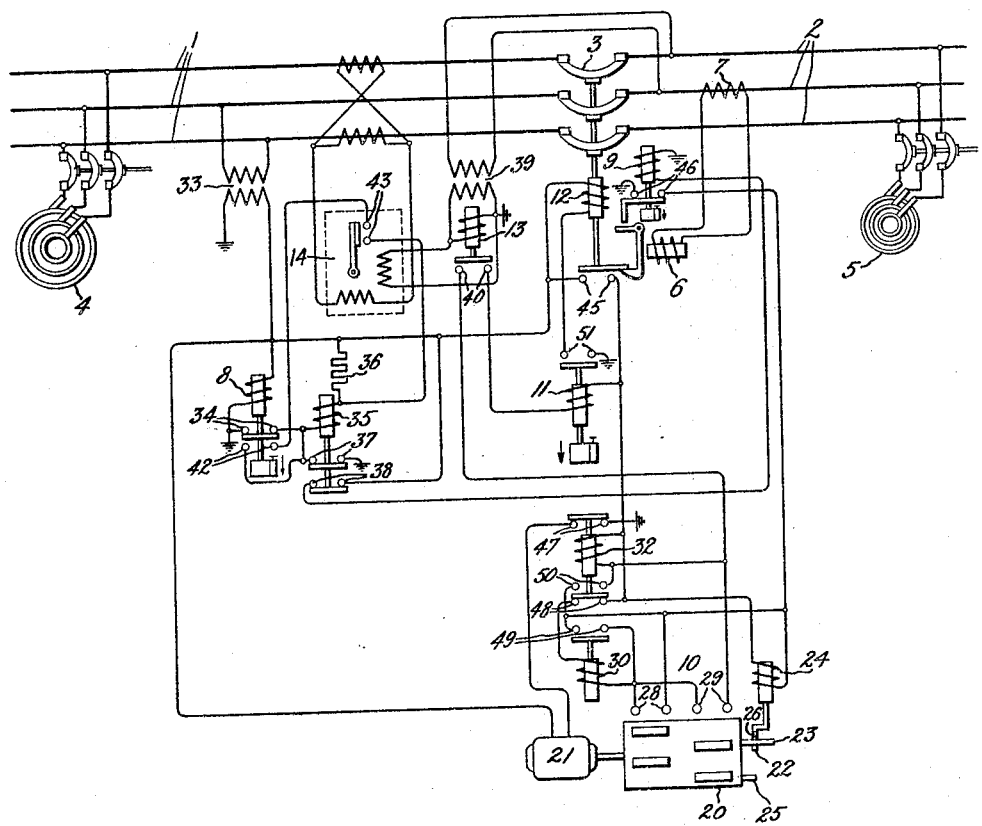
Inventor:
Arvid E. Anderson
by Charles E. Tulla
His Attorney Patented Aug. 9, 1932

1,871,401

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

SYSTEM OF ELECTRIC DISTRIBUTION

Application filed October 23, 1928. Serial No. 314,470.

My invention relates to systems of electric distribution and particularly to a system in which electric energy is adapted to be transferred from one electric circuit to another under predetermined conditions.

In some localities there are systems of electric distribution which under normal operating conditions may be supplied either from a larger system or from a local source of current. One object of my invention is to provide an improved arrangement for such a system of electric distribution whereby smaller system is disconnected from the larger system under abnormal conditions thereon which would cause an excessive amount of energy to flow from the smaller system to the larger system and whereby the two systems are automatically reconnected under predetermined conditions when the larger system is energized.

My invention will be better understood from the following description when taken in connection with the accompanying drawing and its scope will be pointed out in the appended claims.

Referring to the accompanying drawing which shows diagrammatically an arrangement embodying my invention, 1 and 2 represent two electric circuits which are connected together by a circuit breaker 3 which may be of any suitable type examples of which are well known in the art. The circuits 1 and 2 are arranged to be energized independently by suitable sources of current such as the generators 4 and 5 respectively.

In the arrangement shown in the drawing it is assumed that the circuit 1 is a part of a large system of electric distribution whereas the circuit 2 is part of a smaller system of electric distribution.

Since it is desirable to disconnect the two circuits from each other when an excessive current flows in either direction through the circuit breaker 3, which is shown in the drawing as being of the well known latched in type, I provide the circuit breaker with suitable overload responsive means such as an overcurrent trip coil 6 which is connected by means of a current transformer 7 so that it is energized in accordance with the current flowing through the circuit breaker 3. While I have shown only one overcurrent trip coil in order to simplify the disclosure it will be obvious to those skilled in the art that in practice a plurality of such devices may be used to protect the various phases of a polyphase circuit.

Since the capacity of the source 5 is relatively small compared to the capacity of the larger system of which the circuit 1 constitutes a part it is desirable to effect the disconnection of the two circuits 1 and 2 from each other when the source 4 fails for any reason to supply current to the circuit 1 while the circuit breaker 3 is closed. For accomplishing this result, I provide a power directional relay 14 which is connected so as to be responsive to the direction of current flow through the circuit breaker 3 and a voltage relay 8 which is responsive to the voltage of the circuit 1. The relays 14 and 8 are so arranged that when simultaneously current flows from circuit 2 to circuit 1 and the voltage of circuit 1 is below a predetermined value they effect the deenergization of a low voltage release 9 associated with the circuit breaker 3. The release 9 is normally energized from the circuit 1 and is arranged in any suitable manner so that when it is deenergized it effects the opening of the circuit breaker 3.

The power directional relay 14 may be of the ordinary current directional type or of the watt type which closes its contacts when a certain amount of power flows from circuit 2 to circuit 1 and it is intended that the expression "power directional means" shall cover both types of devices.

For effecting the reclosing of the circuit breaker 3, I provide a suitable timing device 10 which is arranged to effect the energization of a control relay 11 for the closing coil 12 of the circuit breaker after it has remained open for a predetermined time. Since it is desirable that the circuit breaker 3 should be closed only when the circuit 1 is independently energized the timing device 10 is connected so that it is energized from the circuit 1 and, therefore, is operative to effect the reclosing of a circuit breaker only when the voltage of the circuit 1 is above a predetermined value.

I also provide a voltage relay 13 which is responsive to the voltage of the circuit 2 and which controls the circuit of the control relay 11 in such a manner that the timing device 10 can effect the reclosing of the circuit breaker 3 only when the voltage of the circuit 2 is below a predetermined value.

As shown in the drawing the timing device 10 is of the type well known in the art as a motor operated timer and comprises a timer 20 and a driving motor 21. The timer 20 is normally prevented from rotating by a stop 22 which engages a projection 23 on the timer. The stop 22 is arranged to be moved out of engagement with the projection 23 by the energization of a release magnet 24 which is arranged to be energized when the circuit breaker 3 is open and the circuit 1 is energized. The stop 22 is also arranged to engage another projection 25 on the timer when the magnet 24 is energized and the timer is in a predetermined position. This position is called the lockout position and when the timer is held in this position by the stop 22, further operation of the timer is prevented although the circuit breaker 3 may be open. The stop 22 is provided with a groove 26 which is so spaced that the projection 25 is in this groove when the timer is held in its lockout position. Consequently, the release magnet 24 is also prevented from automatically returning to its normal deenergized position if its coil is deenergized after the timer is locked out.

The timer 20 is provided with two sets of contacts 28 and 29 which are arranged to be closed in a predetermined sequence as the timer rotates and so that only one set of contacts is closed at any instant. When the contacts 28 are closed, a circuit is completed for a control relay 30 if the circuit breaker 3 is open. When the relay 30 is energized, it completes a locking circuit for itself so that when the contacts 28 are subsequently opened the relay 30 remains energized as long as the circuit breaker 3 remains in its open position. When the contacts 29 are closed after the relay 30 has been energized a circuit is immediately completed for the control relay 11 which effects the closing of the circuit breaker if the contacts of the relay 13 are closed. The closing of the contacts 29 also effects the energization of a control relay 32 which in turn opens the circuit of the driving motor 21 so that the timer stops.

The operation of the arrangement shown in the drawing is as follows:

When the circuit breaker 3 is closed and both of the circuits 1 and 2 are energized by their respective sources 4 and 5, the various control devices occupy the positions shown in the drawing. The voltage relay 8, which is connected across one phase of the electric circuit 1 by means of the potential transformer 33, maintains its contacts 34 closed so that the coil of an associated control relay 35 and a resistor 36 are connected in series across the secondary of the voltage transformer 33. Relay 35 by maintaining its contacts 37 closed, completes a locking circuit for itself so that the relay is not deenergized by the voltage relay 8 opening its contacts 34. Relay 35 by maintaining its contacts 38 closed, connects the low voltage trip coil 9 of the circuit breaker 3 across the secondary of the voltage transformer 33. Since the circuit 2 is energized the voltage relay 13, which is connected across one phase of the circuit 2 by means of the voltage transformer 39, maintains its contacts 40 open.

In case the source 4 fails or some other abnormal condition occurs on the circuit 1 so that current flows from the circuit 2 to the circuit 1 so that reverse current relay 14 closes its contacts 43 and the voltage of circuit 1 decreases sufficiently to cause the relay 8 to open its contacts 34 and close its contacts 42, a shunt circuit is completed around the coil of the relay 35 through the contacts 42 of the relay 8 and the reverse current relay contacts 43. Relay 35 by opening its contacts 38 effects the deenergization of the low voltage release coil 9 which in turn effects the opening of the circuit breaker 3.

When the voltage across the circuit 1 increases above a predetermined value after the circuit breaker 3 is opened, the voltage relay 8 closes its contacts 34 and effects the energization of the control relay 35 which in turn completes the circuit of the low voltage release coil 9. A circuit is then completed across the secondary of the transformer 33 for the release coil 24 of the timer 20. This circuit includes the auxiliary contacts 45 on the circuit breaker 3 and the contacts 46 of the low voltage release coil 9. When the magnet 24 is energized, the stop 24 is moved out of engagement with the projection 23 so that the timer 20 is free to be rotated by the motor 21 which is connected across the secondary of the transformer 33 by the contacts 47 of the control relay 32.

When the timer closes its contacts 28 a circuit is completed across the secondary of the transformer 33 for the control relay 30. This circuit also includes the auxiliary contacts 45 on the breaker 3, contacts 48 of the control relay 32 and contacts 46 of the low voltage release coil 9. Relay 30 by closing its contacts 49 completes a locking circuit for itself which is independent of the timer contacts 28 so that when these contacts 28 are subsequently opened the relay 30 is not deenergized. When the timer 20 subsequently closes its contacts 29 a circuit is completed across the secondary of the transformer 33 for the control relay 32. This circuit also includes the auxiliary contacts 45 on the circuit breaker 3, contacts 49 of the control relay 30 and the contacts 46 of the low voltage release coil 9. Relay 32 by opening its contact 47 deenergizes the motor 21 so that the timer driving motor 21 stops, and by closing its contacts 50 completes a locking circuit for itself which is independent of the timer contacts 29 and the contacts 49 of the control relay 30 so that relay 32 remains energized after the relay 30 opens its contacts 49 due to its circuit being opened by the relay 32 opening its contacts 48. Relays 30 and 32 are arranged in any suitable manner so that relay 32 will close its locking circuit through contacts 50 before relay 30 opens at contacts 49 the original energizing circuit for the relay 32.

If the load circuit 2 is deenergized at the instant the timer contacts 29 are closed so that the contacts 40 of relay 13 are closed, a circuit is immediately completed across the secondary of the transformer 33 for the control relay 11. This circuit also includes the auxiliary contacts 45 on the circuit breaker 3, contacts 49 of the control relay 30 and the contacts 46 of the low voltage release coil 9. Control relay 11 by closing its contacts 51 connects the closing coil 12 across the secondary of the transformer 33 so as to effect the closing of the circuit breaker 3.

The closing of the circuit breaker 3 effects the deenergization of the control relay 32 so that its contacts 47 are closed and the driving motor 21 is energized and returns the timer 20 to its normal position. Since the circuit breaker 3 is closed, the closing of the timer contacts 28 during the restoring movement of the timer does not effect the energization of the control relay 30. Furthermore the release magnet 24 is not energized and therefore the stop 22 is not in a position to engage the lockout projection 25 and stop the timer 20 in its lockout position. When the timer 20 reaches its normal position it is held in that position by the projection 23 engaging the stop 22.

If the circuit 2 is energized so that the contacts 40 of the relay 13 are open when the timer closes its contacts 29 and effects the energization of the control relay 32, the timer 20 stops and reclosing of the circuit breaker 3 can not take place until the circuit 2 is deenergized so that the voltage relay 13 closes its contact 40. Then the closing of the circuit breaker 3 is effected without any added time delay and the timer 20 is restored to its normal position in the manner above described.

In case an overload occurs on either circuit when the circuit breaker 3 is closed, the overcurrent trip coil 6 effects the opening of the circuit breaker. The reclosing of the circuit breaker is then effected by the motor operated timer 10 in the manner above described. If the overload is of a permanent character so that the circuit breaker 3 is opened immediately after it is reclosed, the timer 20 operates to effect the reclosing of the circuit breaker a plurality of times.

If the circuit breaker 3 is open so that the magnet 24 is energized when the timer 20 reaches its lockout position, the projection 25 on the timer enters the groove 26 in the stop 22 which is in the path of movement of the projection 25. Therefore, further rotation of the timer 20 is prevented, and therefore the circuit breaker 3 cannot be automatically reclosed thereby until the timer is released manually.

While I have in accordance with the patent statutes shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In a system of electric distribution, two electric circuits, a circuit breaker for connecting said circuits together, power directional means for voltage responsive means for effecting the opening of said circuit breaker when simultaneously current flows from one of said circuits to the other and the voltage of the interconnected circuits is below a predetermined value, and means controlled by predetermined voltages of said circuits for effecting the reclosure of said circuit breaker.

2. In a system of electric distribution, two electric circuits, a circuit breaker for connecting said circuits together, power directional means and voltage responsive means for effecting the opening of said circuit breaker when simultaneously current flows from one of said circuits to the other and the voltage of the interconnected circuits is below a predetermined value, and means responsive to the voltages of said circuits for effecting the reclosure of said circuit breakers when the voltage of said one of said circuits is below a predetermined value and the voltage of the other circuit is above a predetermined value.

3. In a system of electric distribution, two electric circuits, a circuit breaker interconnecting said circuits, means for effecting the opening of said circuit breaker including a power directional relay and a voltage responsive relay arranged to effect the opening of said circuit breaker when simultaneously the voltage of the interconnected circuits is below a predetermined value and current flows in a predetermined direction through said circuit breaker, and means responsive to predetermined voltage of said circuits for controlling the reclosing of said circuit breaker.

4. In combination, two electric circuits, means for supplying current to each circuit, the capacity of the current supplying means for one circuit being smaller than the capacity of the other current supplying means, a circuit breaker connecting said circuits together, means responsive to the voltage of said circuits and the direction of current flow through said circuit breaker for effecting the opening of said circuit breaker when current flows from the circuit supplied by the smaller current supplying means to the other circuits, and means responsive to predetermined voltages of the circuits for controlling the reclosing of said circuit breaker when the circuit supplied by the larger current supplying means is energized.

5. In combination, two electric circuits, means for supplying current to each circuit, the capacity of the current supplying means for one circuit being smaller than the capacity of the other current supplying means, a circuit breaker connecting said circuits together, means responsive to the voltage of said circuits and the direction of current flow through said circuit breakers for effecting the opening of said circuit breaker when current flows from the circuit supplied by the smaller current supplying means to the other circuit and the voltage of the interconnected circuits is below a predetermined value, and means controlled by the voltages of said circuits for effecting the closing of said circuit breaker when the voltage of one of said circuits is above a predetermined value and the voltage of the other circuit is below a predetermined value.

6. In combination, two electric circuits, means for supplying current to each circuit, the capacity of the current supplying means for one circuit being smaller than the capacity of the other current supplying means, a circuit breaker connecting said circuits together, means responsive to the voltage of said circuits and the direction of current flow through said circuit breaker for effecting the opening of said circuit breaker when current flows from the circuit supplied by the smaller current supplying means to the other circuit and the voltage of the interconnected circuits is below a predetermined value, and means controlled by predetermined voltages of said circuits for effecting the closing of said circuit breaker when the circuit supplied by the larger current supplying means is energized thereby and the circuit supplied by the smaller circuit supplying means is not energized thereby.

In witness whereof, I have hereunto set my hand this 18th day of October, 1928.

ARVID E. ANDERSON.